United States Patent [19]

Wrenn, Jr. et al.

[11] 4,452,832

[45] Jun. 5, 1984

[54] METHOD FOR DEPOSITING A UNIFORM LAYER OF PARTICULATE MATERIAL ON THE SURFACE OF AN ARTICLE HAVING INTERCONNECTED POROSITY

[75] Inventors: George E. Wrenn, Jr., Clinton; John Lewis, Jr., Oak Ridge, both of Tenn.

[73] Assignee: The United States of America as represented by the United States Department of Energy, Washington, D.C.

[21] Appl. No.: 426,364

[22] Filed: Sep. 29, 1982

[51] Int. Cl.$^3$ .......................... B05D 1/18; B05D 3/02; B05D 3/12

[52] U.S. Cl. ................................. 427/350; 427/385.5; 427/430.1

[58] Field of Search ....................... 427/294, 6, 7, 350, 427/1, 385.5, 430.1

[56] References Cited

U.S. PATENT DOCUMENTS

| | | | |
|---|---|---|---|
| 3,577,344 | 5/1971 | Ardary et al. | 156/336 X |
| 4,062,991 | 12/1977 | Kyte et al. | 427/297 |
| 4,201,611 | 5/1980 | Stover | 427/296 X |

*Primary Examiner*—Michael R. Lusignan

*Attorney, Agent, or Firm*—Fred O. Lewis; Stephen D. Hamel; Michael F. Esposito

[57] ABSTRACT

The invention is a method for depositing liquid-suspended particles on an immersed porous article characterized by interconnected porosity. In one form of the invention, coating is conducted in a vessel containing an organic liquid supporting a colloidal dispersion of graphite sized to lodge in surface pores of the article. The liquid comprises a first volatile component (e.g., acetone) and a second less-volatile component (e.g., toluene) containing a dissolved organic graphite-bonding agent. The liquid also contains an organic agent (e.g., cellulose gum) for maintaining the particles in suspension. A porous carbon article to be coated is immersed in the liquid so that it is permeated therewith. While the liquid is stirred to maintain a uniform blend, the vessel headspace is evacuated to effect flashing-off of the first component from the interior of the article. This causes particle-laden liquid exterior of the article to flow inwardly through its surface pores, lodging particles in these pores and forming a continuous graphite coating. The coated article is retrieved and heated to resin-bond the graphite. The method can be used to form a smooth, adherent, continuous coating of various materials on various porous articles. The method is rapid and reproducible.

13 Claims, No Drawings

METHOD FOR DEPOSITING A UNIFORM LAYER OF PARTICULATE MATERIAL ON THE SURFACE OF AN ARTICLE HAVING INTERCONNECTED POROSITY

BACKGROUND OF THE INVENTION

This invention relates generally to methods for depositing particles from liquid suspensions of the same. More particularly, it relates to a method for depositing liquid-suspended particles to form a surface layer on an article having interconnected pores. The invention is a result of a contract with the United States Department of Energy.

The invention was made in the course of experiments directed toward finding a reproducible method for depositing uniform coatings of graphite on the exterior surfaces of relatively fragile fibrous-carbon rings. (See U.S. Pat. No. 3,577,344, "Fibrous Thermal Insulation and Method of Making the Same", issued on May 4, 1971). The typical ring comprised more than 90% air by volume and was characterized by a very large number of interconnected small pores. The intention was to provide the fibrous rings with a smooth external coating of graphite while minimizing impregnation of interior pores. Conventional spraying and brushing techniques were tested but were found unsatisfactory for one or more of the following reasons: insufficient deposition, non-uniform deposition, non-reproducibility, or damage to the rings. In another test, a liquid suspension of colloidal graphite was pumped through the wall of a typical ring. This resulted in some impregnation of the ring, but very little graphite was deposited on its external surface.

SUMMARY OF THE INVENTION

Accordingly, it is an object of this invention to provide a novel method for coating the exterior of a highly porous article having many interconnecting pores.

It is another object to provide a method for so coating the porous article while the latter is immersed in a liquid containing a suspension of particulate coating material.

It is another object to provide a single-step method for depositing liquid-suspended particulates onto the surface of a highly porous article traversed by many interconnecting pores.

It is another object to provide a relatively rapid, reproducible method for forming a continuous adherent coating of graphite on the exterior surface of a carbon article having interconnected pores.

Other objects and advantages will be made evident hereinafter.

In one aspect, the invention is a method for increasing the rate of deposition of liquid-suspended particles onto a porous article which is immersed in the liquid and which is characterized by interconnected porosity. The method includes providing a vessel containing an organic liquid in which particles of a coating agent are suspended. The liquid and the vessel cooperatively define a headspace. The liquid comprises a first volatile component and a second, less-volatile component. The article to be coated is immersed in the liquid so that it is permeated therewith. The headspace then is evacuated to effect selective flash-off of the first component from the interior of the article and cause liquid exterior of the article to flow inwardly through surface pores of the article. In another aspect of the invention, the particles of the coating agent are sized to lodge in surface pores of the article.

In another aspect, the invention is a method for coating the exterior of a carbon article having interconnected pores. The first and second components of the coating liquid are organic solvents, and the second component contains a dissolved organic graphite-bonding agent. In another aspect, the invention is a method for forming an adhesive graphite coating on the surface of a fibrous-carbon article having interconnected pores. The first liquid component is acetone, and the second is toluene containing a dissolved resin binder. Following coating with the graphite, the carbon article is recovered and then heated to effect resin-bonding of the graphite coating.

DETAILED DESCRIPTION OF THE INVENTION

The invention will be described as applied to forming a continuous, adherent coating of graphite on the external surface of a relatively fragile and highly porous thermal insulating material in the form of a vacuum-molded ring. The insulating material consisted of intersecting carbon fibers which were carbon-bonded at their points of intersection. The ring was traversed by a great number of minute, interconnected passages and comprised more than 90% air by volume. The typical ring had an outside diameter of 8", an internal diameter of 7¼", and a height of ¾". The following are specific examples of this application of the invention.

EXAMPLE I

A special coating-liquid comprising a colloidal dispersion of graphite and a dissolved resin binder was blended in a vessel provided with stirring means and with a cover which defined a headspace with the surface of the liquid. The headspace was connected to a standard vacuum pump. The coating liquid included a dissolved alkyd resin binder for graphite and a colloidal dispersion of graphite particles. More specifically, the coating medium consisted of 750 grams of graphite platelets (maximum dimension of typical platelet, 44 $\mu$m); 3000 grams of acetone carrier for the graphite; 750 grams of alkyd resin; 1500 grams of toluene (a solvent for the resin); and 50 grams of ethyl cellulose as a colloidal-suspension agent. A carbon ring of the kind described was suspended in the liquid so as to be permeated with the same. The ring was oriented to extend in a horizontal plane.

With the stirrer actuated to blend the coating components, the vacuum pump was energized to reduce the pressure in the vessel headspace to 2 inches of mercury. As will be described, this caused flashing-off of part of the liquid acetone, promoting deposition of suspended graphite particles onto the ring. After 0.5 min., the pump was de-energized. The ring then was removed from the vessel and heated in air at 60° C. to drive off liquids and effect resin-bonding of the graphite deposited thereon. Finally, ring was furnaced at 600° C. for 2 hours in an argon atmosphere to carbonize residual organics and render the article suitable for use at temperatures as high as 3000° C.

Examination of the furnaced ring showed that it was coated with an adherent continuous layer of graphite having a uniform thickness of 45 $\mu$m on its side and bottom surfaces and 55 $\mu$m on its top surface.

EXAMPLE II

In another experiment, the coating solution comprised 750 grams of the above-described graphite powder; 3000 grams of acetone carrier; 750 grams of alkyd resin binder; 1500 grams of toluene; and 50 grams of ethyl cellulose. The liquid was stirred while the headspace above the liquid was maintained at 2 in. Hg for 1 minute. Following drying and furnacing as in Example 1, the ring was examined. It was coated with a smooth, continuous layer of graphite having a uniform thickness of 200 μm in its side and bottom surfaces and 260 μm on its top surface.

EXAMPLE III

In another coating operation conducted in accordance with the invention, the coating liquid consisted of 250 grams of the graphite powder; 4000 grams of acetone; 250 grams of alkyd resin; 1500 grams of toluene; and 50 grams of colloidal-suspension agent. The liquid was stirred while the vessel headspace was evacuated to 5 in. Hg for 2 minutes. The resulting coated ring was dried and then furnaced as described. Examination showed that the ring was coated with a continuous, smooth, adherent layer of graphite having a uniform thickness of 65 μm on its side and bottom surfaces and 80 μm on its top surface.

The accompanying table presents five additional examples of our method as used to form smooth, adherent, protective graphite coatings on porous rings of the kind described above. As indicated, the coating parameters can be varied to obtain uniform coatings of selected thickness.

TABLE I

| Run No. | | Amount (g.) | Headspace vacuum (in. Hg) | Time (min.) | Coating Thickness in μm | | |
|---|---|---|---|---|---|---|---|
| | | | | | *S | B | T |
| 4 | Graphite | 250 | 9 | 4 | 45 | 6 | |
| | Resin | 250 | | | | | |
| | Toluene | 1500 | | | | | |
| | Acetone | 4000 | | | | | |
| | **Agent | 25 | | | | | |
| 5 | Graphite | 500 | 9 | 4 | 45 | 80 | |
| | Resin | 500 | | | | | |
| | Toluene | 2000 | | | | | |
| | Acetone | 4000 | | | | | |
| | Agent | 33 | | | | | |
| 6 | Graphite | 750 | 9 | 4 | 225 | 365 | |
| | Resin | 750 | | | | | |
| | Toluene | 3000 | | | | | |
| | Acetone | 3000 | | | | | |
| | Agent | 50 | | | | | |
| 7 | Graphite | 500 | 9 | 4 | 170 | 200 | |
| | Resin | 500 | | | | | |
| | Toluene | 3000 | | | | | |
| | Acetone | 2000 | | | | | |
| | Agent | 33 | | | | | |
| 8 | Graphite | 500 | 9 | 4 | 105 | 240 | |
| | Resin | 500 | | | | | |
| | Toluene | 3000 | | | | | |
| | Acetone | 4000 | | | | | |
| | Agent | 33 | | | | | |

*S: Sides
B: Bottom
T: Top
**Colloidal-suspension agent

The parameters can be controlled to provide a plurality of similar rings with essentially identical coatings. If desired, the carrier component of the liquid may be a homolog of acetone, whereas the antiflocculant may be a homolog of toluene.

In contrast to the foregoing successful experiments, graphite-coating of the same kind of porous ring was attempted in the same kind of vessel and with a liquid containing 750 grams of the graphite platelets, 750 grams of alkyd resin, 4500 grams of toluene, 50 grams of colloidal-suspension agent but no acetone. The liquid was stirrer continuously while the vessel headspace was maintained at 5 in. Hg for 45 minutes. The ring then was recovered and dried in air at 50° C. Examination showed that it was impregnated with the resin; there was virtually no graphite on the surfaces of the ring.

In another unsuccessful experiment, the coating liquid consisted of 750 grams of graphite, 750 of the resin, 1500 of toluene, 3000 grams of acetone, and 50 grams of suspension agent. A ring of the type described was immersed in the liquid, and the liquid was stirred for 30 minutes in an attempt to effect deposition of the graphite onto the ring with the vessel headspace at atmospheric pressure. Subsequent examination of the ring showed that some graphite had been deposited; however, the rate of deposition was unacceptable, being approximately two orders of magnitude slower than the rates obtained in Examples 1–8.

We do not wish to be bound by any particular theory as to the mechanism by which our method promotes the deposition of suspended particles onto the surface of articles having interconnected porosity. It is our opinion, based on our investigations, that evacuating the aforementioned headspace effects selective flash-off of the more volatile liquid component from the coating liquid and thus from the interior passages of the article. As a result, particle-containing liquid flows into the article from all directions, lodging particles in the surface pores and forming a continuous surface layer of the deposited material. In the absence of such flashing-off, little or no deposition takes place on the surface. Evacuating the headspace also promotes deposition by initially removing sorbed air from the porous article.

Referring to our coating liquid more generally, we prefer that the volatile carrier, the less-volatile carrier, the colloidal-suspension agent, and the binder all be organic materials. The basic requirement for the carrier is that it contains two components, one of which is volatile near room temperature and one of which has a lower volatility. The binder preferably is an organic resin which dissolves in one or both components of the carrier liquid and which can be fired in an inert atmosphere to leave carbon. Depending on the application, the binder may be a thermosetting or thermoplastic material. The colloidal-suspension agent may be any compatible material—a few examples being cellulose gum, ethyl cellulose, hydroxypropyl cellulose, and fluorosurfactants. The porous article to be coated may be of various configurations and be composed of various materials having sufficient interconnected porosity to permit inflow of the carrier liquids as described. It is within the scope of the invention to effect deposition of any suitable particulate material—as, for example, graphite flakes, metal powders, and boron nitride flakes—on any such article. Preferably, the suspension of the coating material is a colloidal suspension.

The following are a few examples of liquid-carrier combinations which may be used to accomplish the purposes of the invention.

| Carrier-Liquid Components | |
|---|---|
| Low-Volatility Component | High-Volatility Component |
| Toluene | Acetone |
| Xylene | Methanol |
| Butyl Alcohol | " |
| Banana Oil | Methylated ethanol |
| Turpentine | Ethyl Acetate |
| Dipentene | Methanol |
| Naptha Thinner | " |
| Pine Oil | Trichloroethylene, Isopropyl alcohol |

Given the teachings presented herein, one versed in the art can determine the coating parameters most suitable for a particular application, without resorting to more than routine experimentation. It is intended that the scope of the invention be determined from the appended claims.

What is claimed is:

1. A method for depositing liquid-suspended particles on a porous article characterized by interconnected porosity, and immersed in the liquid, said method comprising:
   providing a vessel containing an organic liquid, said liquid and vessel defining a headspace, said liquid containing a dispersion of coating-agent particles and comprising a first volatile component and a second component having lower volatility than the first, said particles being sized to lodge in surface pores of said article,
   immersing said article in said liquid to effect permeation of said article with said liquid, and
   evacuating said headspace to selectively flash-off said first component and cause liquid exterior of said article to flow inwardly through surface pores thereof.

2. The method of claim 1 wherein said dispersion is a colloidal dispersion of particles sized to lodge in surface pores of said article.

3. A method for coating the exterior of an article traversed by interconnecting pores, comprising:
   providing a vessel containing a liquid, said liquid and vessel defining a headspace, said liquid containing a dispersion of coating-agent particles sized to lodge in surface pores of said article, said liquid comprising a first component having a selected volatility and a second component having a lower volatility and containing in solution an organic bonding agent for said particles,
   immersing said article in said liquid to effect filling of said interconnecting pores with said liquid, and
   evacuating said headspace to selectively flash-off first component from said interconnecting pores and cause liquid contiguous with the exterior of said article to flow inwardly through said surface pores and effect bridging of the same with said particles.

4. The method of claim 3 wherein said dispersion is a colloidal dispersion.

5. The method of claim 4 further characterized by said liquid containing a colloidal-suspension agent.

6. The method of claim 3 further characterized by stirring said liquid during said evacuating operation.

7. A method for preferentially coating the exterior of a carbon article traversed by interconnecting pores, said method comprising:
   providing a vessel containing a liquid, said liquid and vessel defining a headspace, said liquid containing a dispersion of graphite particles sized to lodge in surface pores of said article, said liquid comprising a first organic solvent and a second organic solvent, the second solvent having a lower volatility than the first and containing in solution an organic graphite-bonding agent,
   immersing said articles in said liquid to effect filling of said interconnecting pores therewith, and
   evacuating said headspace sufficiently to effect selective flash-off the first solvent from said interconnecting pores and cause liquid contiguous with the exterior of said article to flow inwardly through said surface pores and bridge the same with graphite particles.

8. The method of claim 7 wherein said dispersion is a colloidal dispersion.

9. The method of claim 7 wherein the first organic solvent is selected from the group consisting of acetone and homologs thereof.

10. The method of claim 7 wherein the second organic solvent is selected from the group consisting of toluene and homologs thereof.

11. The method of claim 7 further characterized by said liquid containing an organic colloidal-suspension agent.

12. The method of claim 7 further characterized by the steps of recovering the resulting wet, coated articles and heating the same to a temperature effecting bonding of said coating with said carbon article.

13. A method for forming an adhesive graphite coating on a carbon article having interconnected porosity, said method comprising:
   providing a vessel containing a liquid, said liquid and vessel defining a headspace, said liquid containing a dispersion of colloidal graphite particles sized to lodge in surface pores of said article and also containing in solution a resin binder, said liquid comprising a first organic solvent selected from the group consisting of acetone and homologs thereof, and a second organic solvent selected from the group consisting of toluene and homologs thereof,
   immersing said article in said liquid to fill interconnecting pores thereof with said liquid,
   evacuating said headspace to selectively flash-off the first solvent from said interconnecting pores and cause liquid to flow into said article, thus lodging said particles in said surface pores and forming a resin-containing particulate coating on said article, recovering the resulting coated article, and
   heating the recovered article to dry the same and effect resin-bonding of said coating.

* * * * *